United States Patent
Sauer

(10) Patent No.: US 8,370,467 B1
(45) Date of Patent: Feb. 5, 2013

(54) METHOD FOR SEAMLESSLY PROVIDING INCREMENTAL APPLICATION UPDATES TO USERS WHILE SERVING CONTINUOUS LIVE TRAFFIC

(75) Inventor: Frederik Marinus Jan Sauer, Los Altos, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/426,298

(22) Filed: Mar. 21, 2012

Related U.S. Application Data

(60) Provisional application No. 61/544,929, filed on Oct. 7, 2011.

(51) Int. Cl.
*G06F 15/177* (2006.01)

(52) U.S. Cl. ........ 709/221; 709/222; 709/217; 709/218; 709/219

(58) Field of Classification Search .................. 709/221, 709/222, 217, 218, 219, 205; 714/4, 752; 726/3
See application file for complete search history.

(56) References Cited

U.S. PATENT DOCUMENTS

| | | | |
|---|---|---|---|
| 2002/0026478 A1* | 2/2002 | Rodgers et al. | 709/205 |
| 2003/0101245 A1* | 5/2003 | Srinivasan et al. | 709/221 |
| 2007/0239841 A1* | 10/2007 | Lehrman | 709/217 |
| 2009/0276658 A1* | 11/2009 | Lind et al. | 714/4 |
| 2009/0300151 A1* | 12/2009 | Friedman et al. | 709/222 |
| 2010/0125770 A1* | 5/2010 | Keith, Jr. | 714/752 |
| 2010/0217837 A1* | 8/2010 | Ansari et al. | 709/218 |
| 2010/0274869 A1* | 10/2010 | Warila et al. | 709/217 |
| 2011/0016192 A1* | 1/2011 | Reisman | 709/217 |
| 2011/0047597 A1* | 2/2011 | Mahaffey et al. | 726/3 |

* cited by examiner

*Primary Examiner* — Le H Luu
(74) *Attorney, Agent, or Firm* — Birch, Stewart, Kolasch & Birch, LLP

(57) ABSTRACT

Methods and systems are provided for upgrading a web application from an existing version to a new version without causing or creating any interruption in service to clients receiving the upgrade. A combination of techniques and strategies are used to fully migrate all connected clients from a first version to a second version of an application while keeping at least two deployment constraints in mind: (1) prevent clients from running with a mixture of resources from two different versions of an application (e.g., Version A and Version B of a given application); and (2) prevent clients from accessing service endpoints from a different version of the application than the client is running (e.g., accessing service endpoints for Version B when running Version A).

28 Claims, 11 Drawing Sheets

METHOD FOR SEAMLESSLY PROVIDING INCREMENTAL APPLICATION UPDATES TO USERS WHILE SERVING CONTINUOUS LIVE TRAFFIC

The present application claims priority to U.S. Provisional Patent Application Ser. No. 61/544,929, filed Oct. 7, 2011, the entire disclosure of which is hereby incorporated by reference.

TECHNICAL FIELD

The present disclosure generally relates to methods and systems for providing web applications to users. More specifically, aspects of the present disclosure relate to upgrading an existing version of a web application to a new version of the application.

BACKGROUND

Modern web applications are generally comprised of a (potentially large) number of resources (e.g., components), some of which have complex dependencies on one another. Deploying incremental updates to users of such applications requires careful planning and consideration in order to avoid a number of potential pitfalls.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for providing clients with application updates while serving the clients continuous real-time data, the method comprising: serving, by a plurality of servers using a first version of a protocol to communicate with a plurality of client devices, application resources and services for a first version of an application running on each of the plurality of client devices; updating the plurality of servers to communicate with the plurality of client devices using a dual-protocol compatible with both the first version of the application and a second version of the application, the dual-protocol including the first version of the protocol and a second version of the protocol; serving, by the plurality of servers to the plurality of client devices, application resources and services for the second version of the application using the second version of the protocol, the application resources and services for the second version of the application being different from the application resources and services for the first version of the application; and responsive to determining that the second version of the application is installed on each of the plurality of client devices, removing support for the first version of the protocol from the plurality of servers.

In another embodiment, the method for providing clients with application updates further comprises, in response to determining that the second version of the application is installed on each of the plurality of client devices, removing the application resources and services for the first version of the application from the plurality of servers.

In another embodiment, the method for providing clients with application updates further comprises, in response to determining that an application resource for the second version of the application does not exist for the first version of the application, providing the application resource for the second version of the application to the plurality of servers before the plurality of servers begins using the second version of the protocol.

In yet another embodiment, the method for providing clients with application updates further comprises, in response to determining that an application resource for the first version of the application does not exist for the second version of the application, maintaining the application resource for the first version of the application on one or more of the plurality of servers updated to communicate using the second version of the protocol.

In still another embodiment, the application resources and services for the second version of the application include URL fingerprinted resources for the second version of the application, and the method for providing clients with application updates further comprises providing the URL fingerprinted resources for the second version of the application to the plurality of servers before the plurality of servers begins serving the application resources and services for the second version of the application to the plurality of client devices using the second version of the protocol.

In yet another embodiment, the application resources and services for the first version of the application include URL fingerprinted resources for the first version of the application, and the method for providing clients with application updates further comprises maintaining the URL fingerprinted resources for the first version of the application on the plurality of servers following the determination that the second version of the application is installed on each of the plurality of client devices.

In still another embodiment, the application resources and services for the second version of the application include version-specific static resources not included in the application resources and services for the first version of the application, and the method for providing clients with application updates further comprises providing the version-specific static resources to the plurality of servers before the plurality of servers begins serving the application resources and services for the second version of the application to the plurality of client devices using the second version of the protocol.

In still another embodiment, the application resources and services for the first version of the application include version-specific static resources not included in the application resources and services for the second version of the application, and the method for providing clients with application updates further comprises maintaining the version-specific static resources on one or more of the plurality of servers following the determination that the second version of the application is installed on each of the plurality of client devices.

In another embodiment, the application resources and services for the second version of the application include version-specific executable code not included in the application resources and services for the first version of the application, and the method for providing clients with application updates further comprises providing the version-specific executable code to the plurality of servers before the plurality of servers begins serving the application resources and services for the second version of the application to the plurality of client devices using the second version of the protocol.

In yet another embodiment, the application resources and services for the first version of the application include version-specific executable code not included in the application resources and services for the second version of the application, and the method for providing clients with application updates further comprises maintaining the version-specific executable code on one or more of the plurality of servers following the determination that the second version of the application is installed on each of the plurality of client devices.

Another embodiment of the present disclosure relates to a system for providing a client with application updates while serving the client continuous real-time data, the system comprising at least one processor and at least one memory storing computer-executable instructions that, when executed by the at least one processor, cause the at least one processor to: serve, using a first version of a protocol to communicate with at least one client device, application resources and services for a first version of an application running on the at least one client device; update, to communicate with the at least one client device using a dual-protocol compatible with both the first version of the application and a second version of the application, the dual-protocol including the first version of the protocol and a second version of the protocol; serve, to the at least one client device, application resources and services for the second version of the application using the second version of the protocol, the application resources and services for the second version of the application being different from the application resources and services for the first version of the application; and responsive to determining that the second version of the application is installed on the at least one client device, discard support for the first version of the protocol.

Yet another embodiment of the present disclosure relates to a computer-implemented method for providing clients with application updates, the method comprising: serving to a plurality of client devices, using a first version of a communication protocol, application resources and services for a first version of an application running on each of the plurality of client devices; updating to a dual-communication protocol compatible with both the first version of the application and a second version of the application, the dual-communication protocol including the first version of the communication protocol and a second version of the communication protocol; serving to the plurality of client devices, using the second version of the communication protocol, application resources and services for the second version of the application, the application resources and services for the second version of the application being different from the application resources and services for the first version of the application; and responsive to determining that the second version of the application is installed on each of the plurality of client devices, removing support for the first version of the communication protocol.

In other embodiments of the disclosure, the methods and systems described herein may optionally include one or more of the following additional features: the plurality of servers are updated to communicate with the plurality of client devices using the dual-protocol while the plurality of servers serve continuous real-time data to the plurality of client devices; the plurality of servers serve the application resources and services for the second version of the application to the plurality of client devices using the second version of the protocol while also serving continuous real-time data to the plurality of client devices; the support for the first version of the protocol is removed from the plurality of servers while the plurality of servers serve continuous real-time data to the plurality of client devices; and/or the application resources and services for the first and second versions of the application include at least one of version-agnostic resources, version-specific static resources, version-specific executable code, URL fingerprinted resources, and service endpoints.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1A:
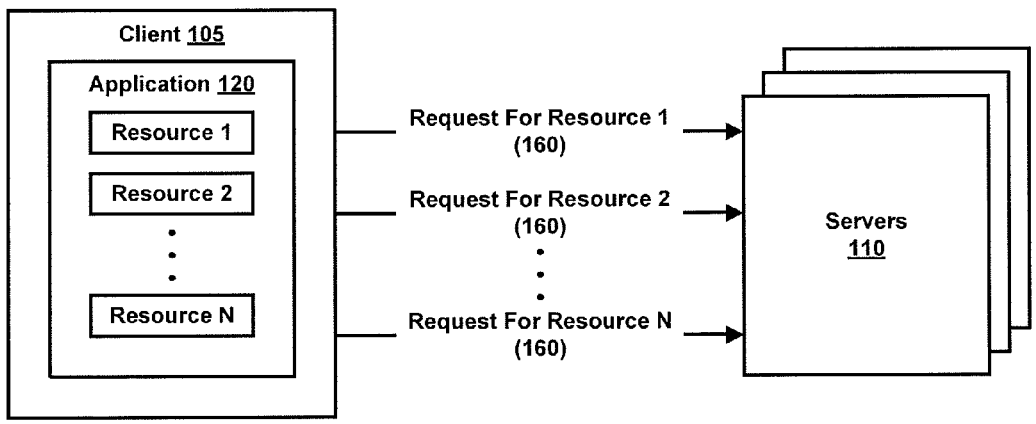
FIG. 1A is a block diagram illustrating an example application resource serving arrangement.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Embodiments of the present disclosure relate to methods and systems for upgrading an application, such as a web application, from an existing version to a new version without causing or creating any interruption in service to clients (e.g., users, consumers, customers, subscribers, etc.).

Figure 1B:
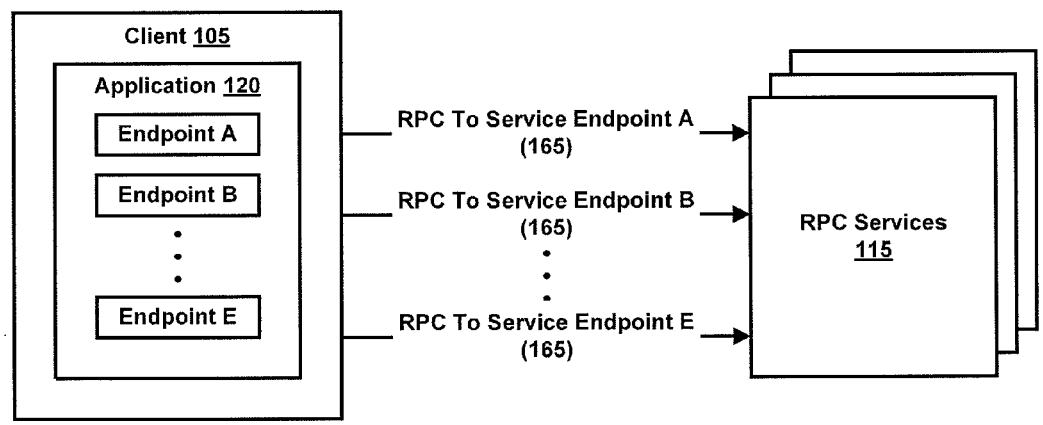
FIG. 1B is a block diagram illustrating an example arrangement of a client issuing remote procedure calls to one or more remote procedure call services.

A web application 120 generally comprises a number of closely-related, dependent resources or files, such as resources 1 through N shown in FIG. 1A (where "N" is an arbitrary number), and also a number of service endpoints, such as endpoints A through E shown in FIG. 1B (where "E" represents an arbitrary number). Examples of resources that may partly comprise a web application (e.g., application 120 shown in FIGS. 1A and 1B) include HTML, CSS, images, JavaScript, and the like. Additionally, some examples of service endpoints that may partly comprise a web application (e.g., application 120 shown in FIGS. 1A and 1B) include login services, authorization services, game data service, logging service, analytics service, etc. Numerous other resources and/or service endpoints may also comprise a given web application in addition to or instead of the example resources and service endpoints described above.

Resources for a web application (e.g., resources 1 through N of application 120 running on client 105 shown in FIG. 1A) may be fetched (e.g., retrieved, obtained, etc.) from one or more servers 110. In at least some arrangements, the servers 110 may be configured to serve (e.g., provide, send, transmit, etc.) the resources in response to requests for resources 160 issued by the client 105 (e.g., user or client terminal, user or client device, browser, etc.) on which the application is running. Additionally, in accordance with one or more embodiments described herein, a scenario is possible in which a single server (e.g., one of servers 110) is used to update a version of an application running (e.g., installed on) a single client (e.g., client 105).

Depending on the particular implementation, the service endpoints for a web application (e.g., endpoints A through E of application 120 running on client 105 shown in FIG. 1B) may be served to a requesting client by the same one or more servers 110 that serve the resources (e.g., resources 1 through N) for the application 120, or by a separate set of remote procedure call (RPC) services servers 115. In some arrangements, the service endpoints A though E for the application 120 may be served or provided to the client 105 by the servers (e.g., servers 110, RPC services servers 115, and/or some combination of the two) in response to the client 105 sending at least one RPC 165 to each of the particular service endpoints A through E.

Figure 2:
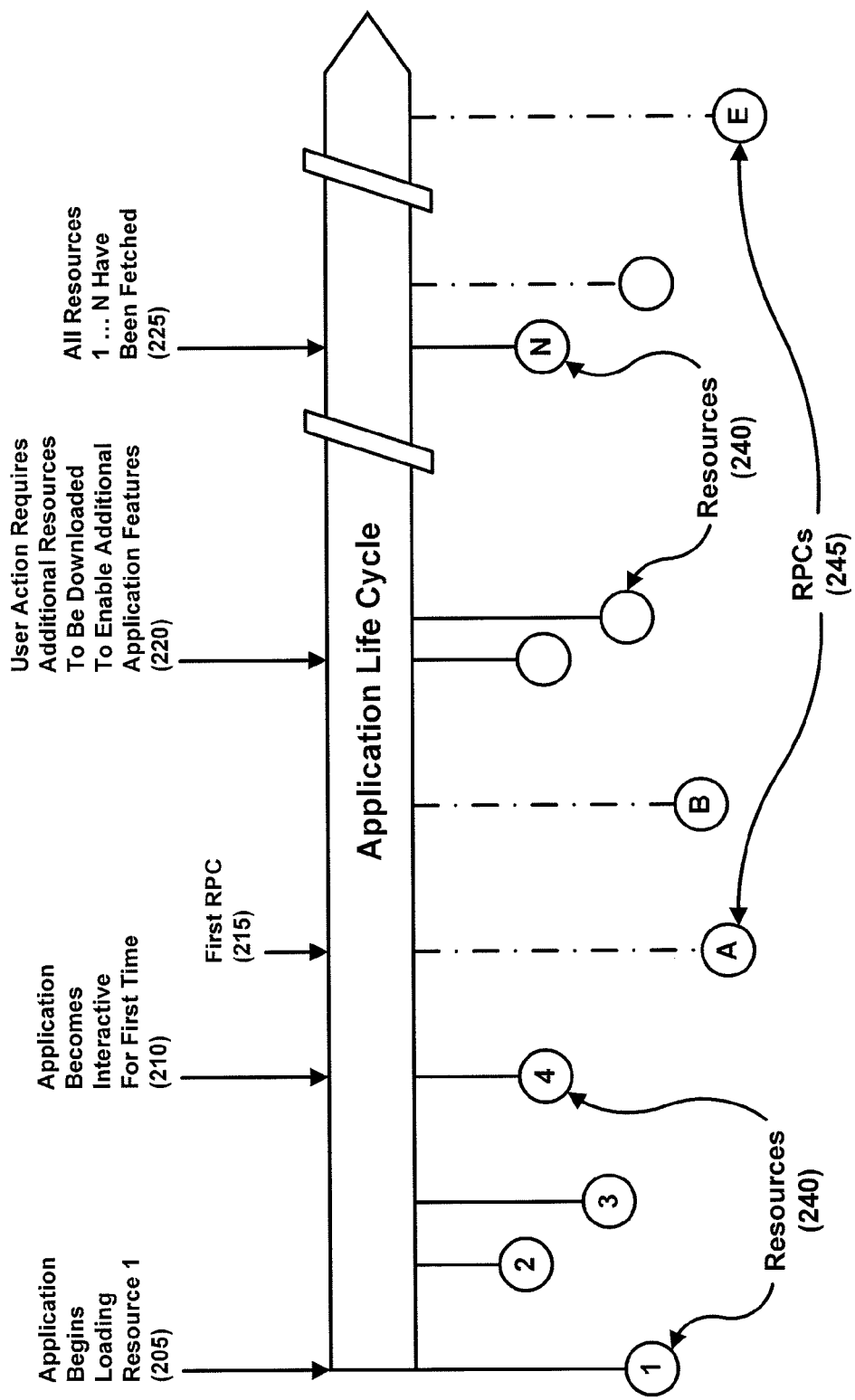
FIG. 2 is a block diagram illustrating an example timeline for an application life cycle.

FIG. 2 is a diagram illustrating an example timeline for an application life cycle. In at least one example, a life cycle for a web application (e.g., application 120 shown in FIGS. 1A and 1B) may include an initialization stage during which the application loads resources such as static content, JavaScript, etc., followed by a server communications stage in which the application begins to fetch or retrieve (e.g., receive in response to issuing a request for) additional content and resources from one or more corresponding servers (e.g., servers 110 shown in FIG. 1A).

In at least the example timeline for an application life cycle shown in FIG. 2, the life cycle may begin by the application loading Resource 1 at stage 205. In some scenarios, the location of Resource 1 is known a priori (e.g., presumptively), and may be referred to as the "landing page," the "bootstrap URL," or any of a number of other such terms similar in meaning. A given application may attempt to fetch all necessary resources 240 (e.g., Resources 1 through N as shown in FIG. 2) within seconds or minutes of a user (e.g., client 105 shown in FIG. 1A) making a first request for the application. Alternatively, some applications may load necessary resources over the lifetime of a user's session (sometimes referred to as "lazily" loading resources), which could last for hours, or with modern browsers and their session recovery capabilities, potentially days, weeks or even longer periods of time.

An example session involving an application may begin at stage 205 with the client (e.g., client 105 shown in FIG. 1A) fetching Resource 1 from a predetermined location. In some scenarios, Resource 1 may have embedded within it references to one or more additional resources 240, while in other scenarios Resource 1 may not have any such embedded references. Where Resource 1 does have embedded within it references to one or more additional resources 240, these additional resources may be fetched immediately or lazily fetched over some later period of time. As these additional resources 240 are fetched, they may in turn have their own references to one or more other resources. For example, at stage 220 of the application life cycle, user action may require that additional resources be downloaded (e.g., retrieved, fetched, etc.) to enable one or more additional application features or functions. Such a process may continue until all Resources 1 through N have been fetched at stage 225 of the cycle.

During the application life cycle, the application may begin issuing RPCs 245 to service endpoints (e.g., service endpoints A through E). For example, after the application becomes interactive for the first time at stage 210 of the life cycle, the application may issue a first RPC at stage 215. In some scenarios, this process of the application issuing RPCs 245 to service endpoints may continue for a (potentially long) period of time after the last resource (e.g., Resource N) has been fetched at stage 225 of the cycle.

Figure 3:
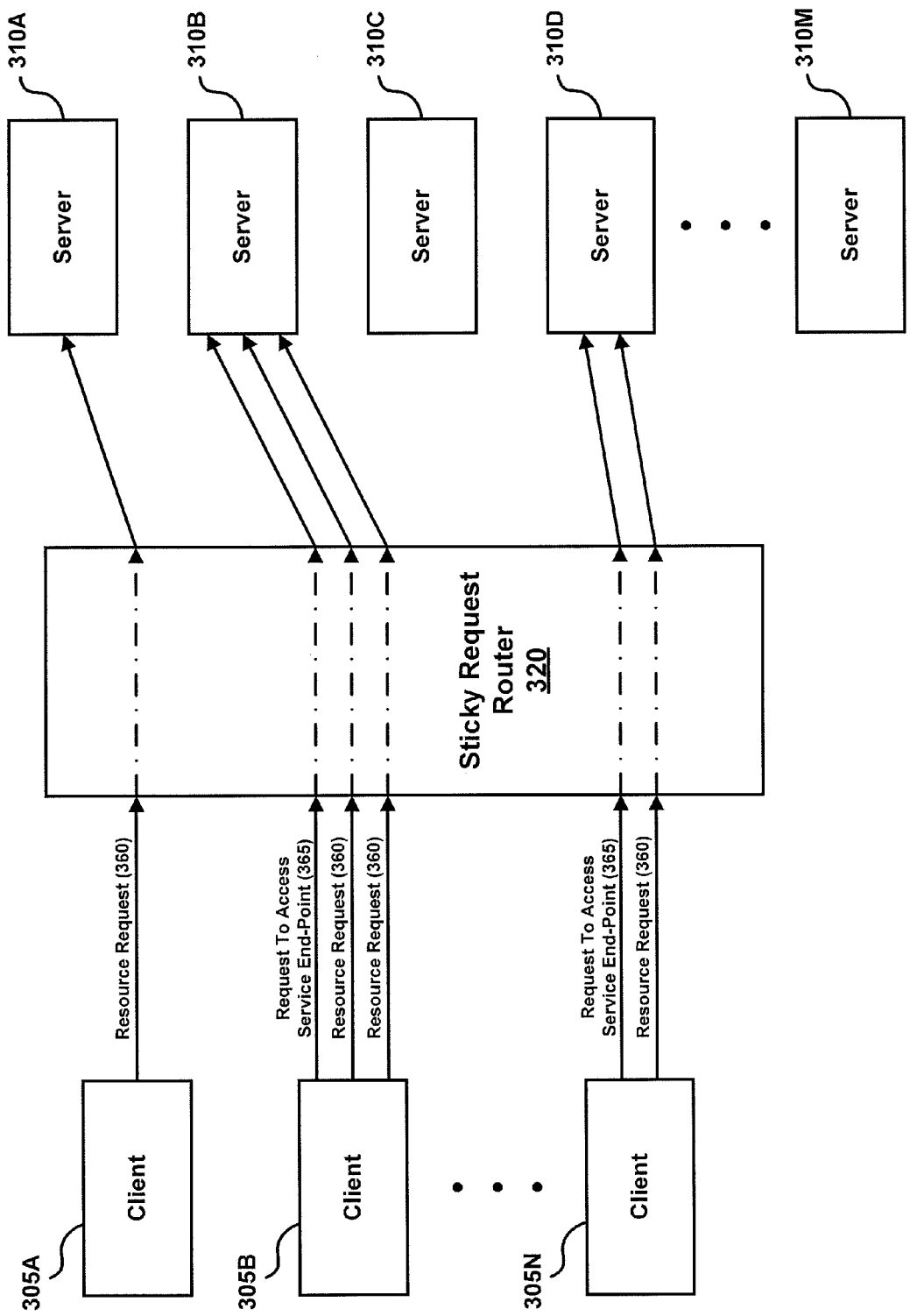
FIG. 3 is a block diagram illustrating an example arrangement for sticky request routing.

FIG. 3 is a functional block diagram showing an example arrangement for sticky request routing. As clients 305A through 305N (where "N" is an arbitrary number) make resource requests 360 to fetch necessary resources and/or make requests to access service endpoints 365, such requests are routed to available servers 310A through 310M (where "M" is an arbitrary number) via sticky request router 320. In a sticky request routing arrangement such as that shown in FIG. 3, request routes (e.g., routes for resource requests 360 and/or routes for requests to access service endpoints 365) can made to be persistent for the life of an application session, which provides a permanent binding between specific clients and specific servers. For example, with sticky request routing, resource requests 360 issued by client 305A are routed, by the sticky request router 320 to server 310A, which is the server that client 305A is "bound" to for its lifetime. Similar bindings may be established and maintained between other clients 305B through 305N and other servers 310B through 310M. In a sticky request routing arrangement, the binding of a given client to a given server may be based on a session token, a cookie, the client's IP address, or any number of other statistically determinable variables.

While sticky request routing may provide the advantage that clients (e.g., clients 305A through 305N shown in FIG. 3) are not affected by application version changes made to servers other than those to which the clients are bound, sticky request routing has drawbacks, such as the inability to easily shift traffic based on server utilization. Furthermore, sticky request routing does not solve problems associated with server upgrades occurring in the face of client sessions that can last for relatively long periods of time (e.g., days, weeks, etc.).

Figure 4:
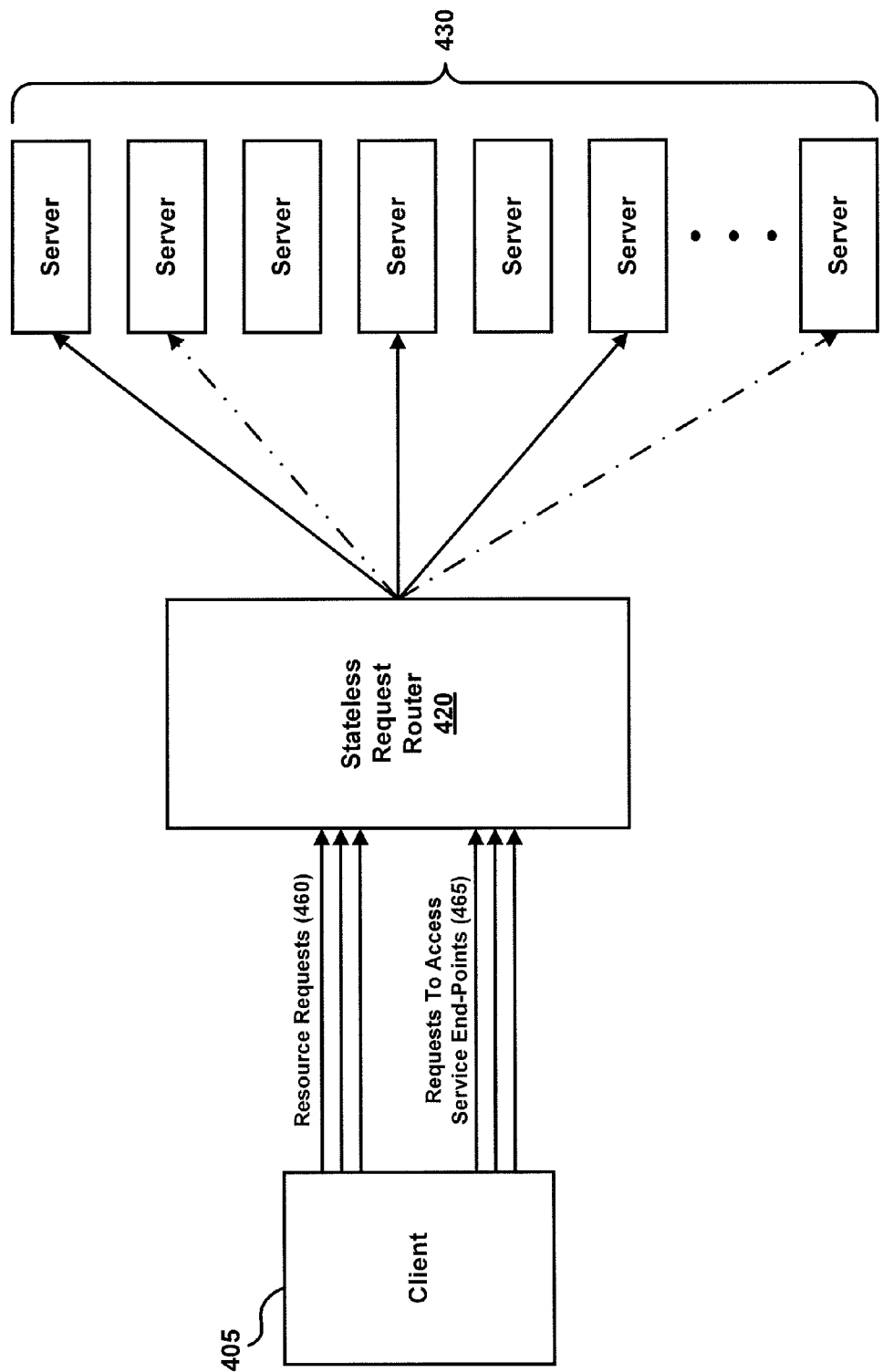
FIG. 4 is a block diagram illustrating an example arrangement for stateless request routing.

FIG. 4 is a functional block diagram showing an example arrangement for stateless request routing. Stateless request routing involves distributing traffic to available servers based on capacity or some other notion of fairness. As a client 405 makes resource requests 460 to fetch necessary resources and/or makes requests to access service endpoints 465, such requests are routed to available servers 430 via stateless request router 420. In a stateless request routing arrangement such as that shown in FIG. 4, request routes (e.g., routes for resource requests 460 and/or routes for requests to access service endpoints 465) are not made persistent for the life of an application session, and instead may change based on, for example, the current capacity of one or more servers serving such requests. Changes in request routes may also be made in response to any of a variety of other conditions including, for example, whether or not a particular server is currently available to serve requests, whether a particular server is down for maintenance (e.g., preparing to be upgraded), and the like. As such, subsequent requests made by a given client (e.g., client 405) may be routed to a different server (e.g., of available servers 430) depending on the conditions involved.

Stateless request routing approaches such as that illustrated in the example arrangement of FIG. 4 are preferred over sticky request routing approaches such as that illustrated in the example arrangement of FIG. 3. Among other reasons, stateless request routing approaches are more desirable because they involve trivial load balancing, are very scalable in nature, and are robust in the sense that requests can continue to be fulfilled in the event that one or more of the servers (e.g., servers 430 shown in FIG. 4) fails.

Because such stateless request routing systems continue to operate and serve traffic during application version upgrades and cannot afford periods of scheduled downtime, already updated servers resume serving traffic before the entire fleet of servers 430 has been fully updated to the new version.

In order to deploy a new version of an application to clients, the new version of the application should (eventually) be rolled-out to all applicable servers associated with the application. For example, before the rollout (e.g., distribution, launch, release, etc.) of a new version (e.g., Version B) of an application begins, all servers (e.g., in a group of servers designed or designated to serve requests associated with the application) are serving Version A of the application. At any point in time during the rollout process, each individual server in the group is either serving the old Version A of the application, the new Version B of the application, or is made temporarily unavailable as the server prepares to serve Version B of the application. Finally, the rollout is complete once all the servers in the group are serving Version B of the application.

Figure 5:
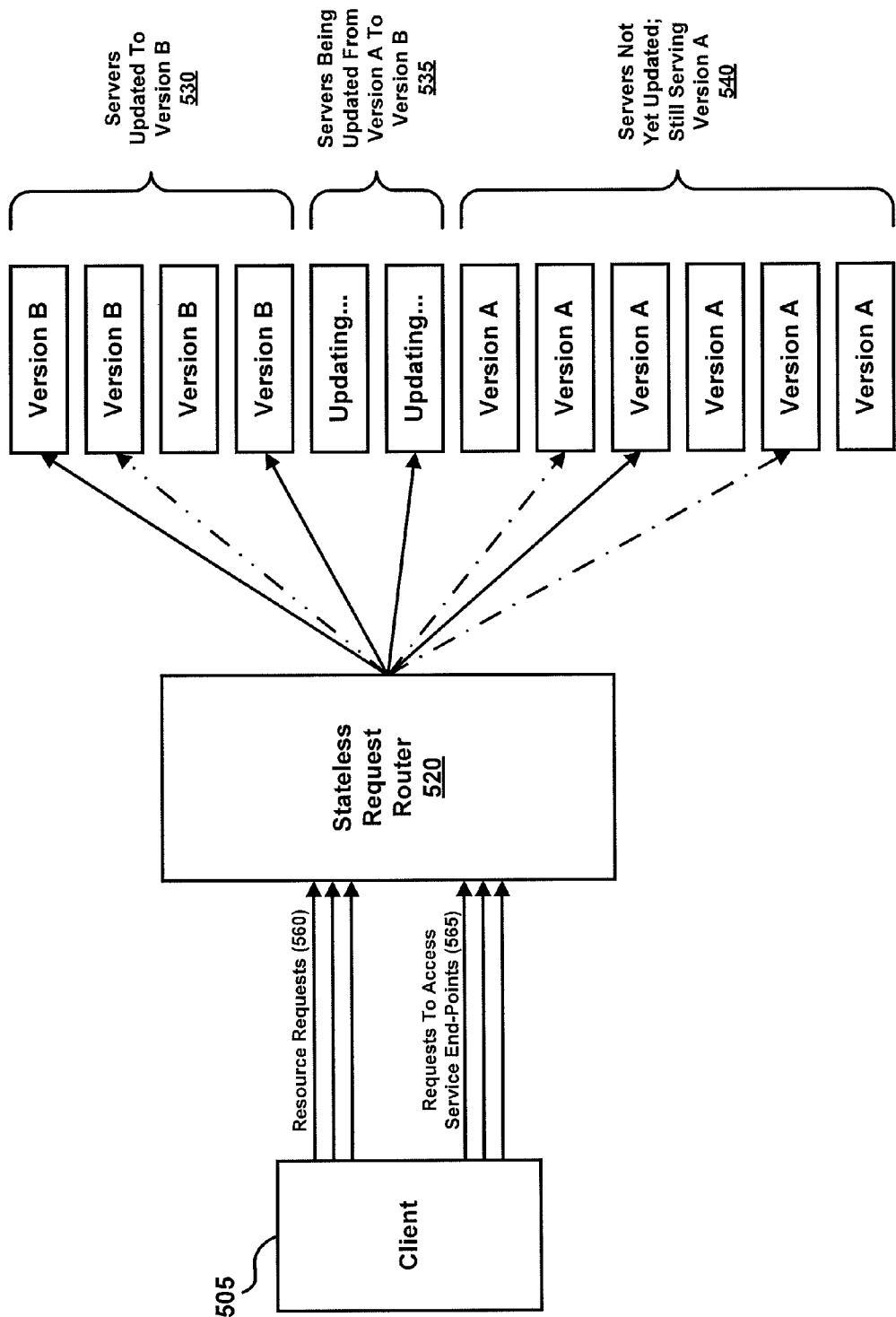
FIG. 5 is a block diagram illustrating resource and service endpoint requests being routed to servers running different versions of an application.

With reference to the functional block diagram shown in FIG. 5, during the deployment process for a new version (e.g., Version B) of an application, individual requests from a client 505, such as resource requests 560 and/or requests to access service endpoints 565 may be routed to servers running different versions of the application. For example, some requests from the client 505 may be routed, via stateless request router 520, to servers already updated with the new version of the application 530, while other requests are routed either to servers undergoing the updating process from the old version to the new version 535 (e.g., Version A to Version B) or to servers still serving the old version 540 (e.g., servers that have not yet started the updating process to Version B).

Figure 6:
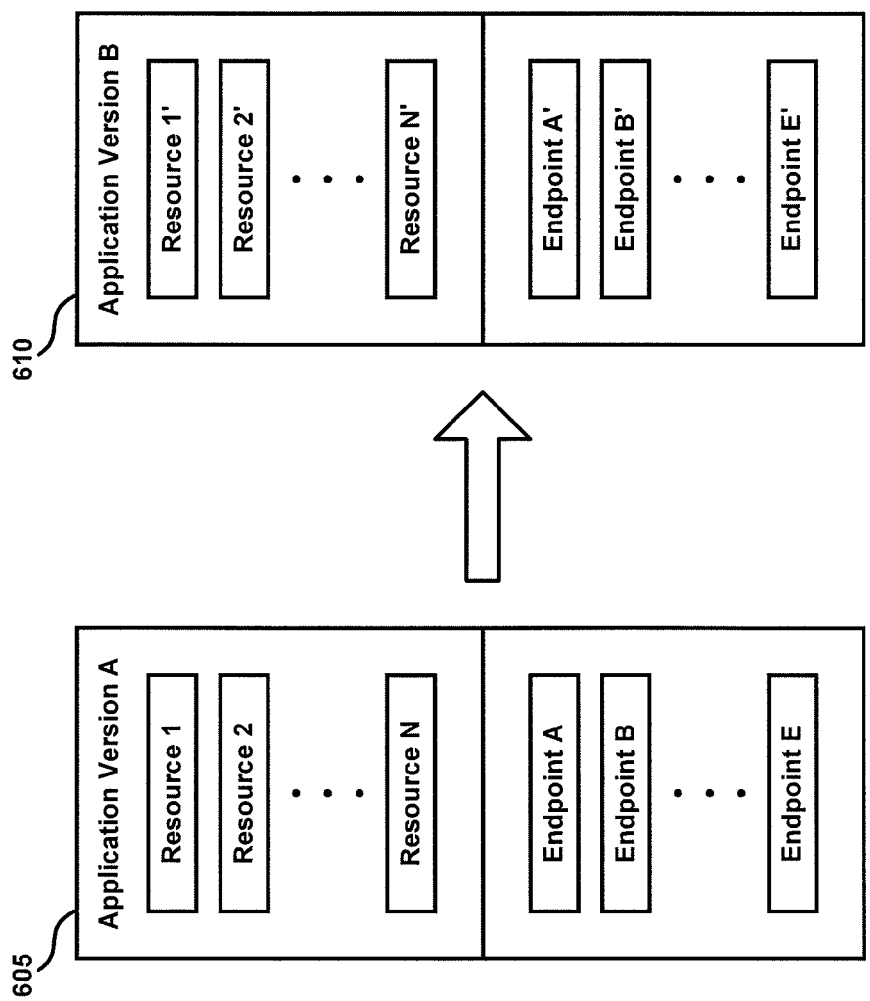
FIG. 6 is a block diagram illustrating consecutive versions of an example application together with resources and service endpoints for each version.

Consecutive versions of the same application may often have similar, yet importantly different, resources and service endpoints. For example, FIG. 6 is a block diagram illustrating two consecutive versions of an example application, Application Version A 605 and Application Version B 610. While Application Version A 605 includes Resources 1 through N and Service Endpoints A through E, Application Version B 610 includes Resources 1' through N' and Service Endpoints A' through E'. In at least some scenarios, one or more of the resources and service endpoints comprising Application Version B 610 may be different from their counterpart comprising the older Application Version A 605. Furthermore, it should be noted that the number of resources and/or the number of service endpoints may not necessarily be the same across different versions of an application. For example, N and N' may not necessarily represent the same number, and/or E and E' may not represent the same number.

Given the various scenarios described above, a client (e.g., client 505 shown in FIG. 5) may likely be served resources and responses from service endpoints from a mixture of servers running both Version A and Version B of a given application. In real world applications it can be difficult to determine the precise implications of a client receiving a mixture of resources and service responses from a group of servers running both Version A and Version B of the application. The following presents some example scenarios that might arise under circumstances involving a group of servers running consecutive versions of an application such as those described above, along with possible implications that may result:

1. Resource locations (e.g., URIs) may be identical for both versions, yet serve different contents. Such differences in contents served may be: (a) forward compatible only; (b) backward compatible only; or (c) incompatible.

2. A particular resource may only exist in one of the two versions. While the presence of the resource in the one version is unlikely to be harmful to a client, the absence of said resource where it is expected may be (a) harmless: noticeable, but not having any effect on the application's functionality; or (b) disastrous: the application becomes defective.

3. Services may only exist in one of the two versions. While the presence of an additional service is unlikely to cause problems, the absence of a service may again be either harmful or disastrous.

4. Services may exist at the same endpoint in both versions of the application, but provide different responses to the identical inputs. The differences in the responses may be: (a) forward compatible only; (b) backward compatible only; or (c) incompatible.

Figure 7A:
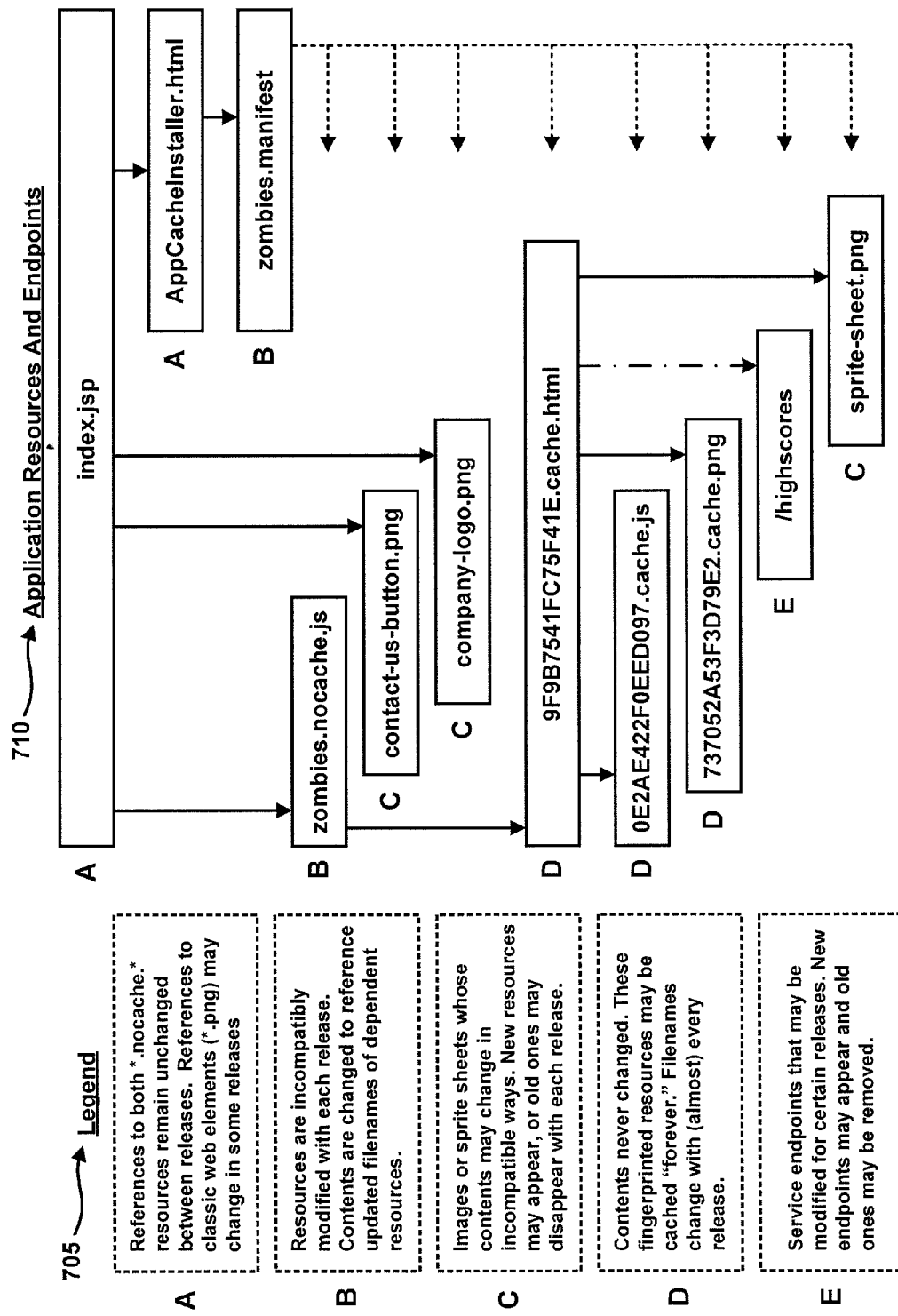
FIG. 7A is a block diagram illustrating an example flow of application resources and service endpoints.

FIG. 7A is a block diagram illustrating a concrete example of a scenario where a group of servers are running two versions (e.g., an older or previous version and a new or updated version) of an application. The example illustrated involves a hybrid web application, comprising example application resources and endpoints 710, that uses conventional methods to reference certain resources, and URL fingerprinting for other parts of the application. FIG. 7A also includes a Legend 705, where each of the boxes is identified by a letter ("A" "B" "C" "D" and "E") and corresponds to similarly-identified elements in the diagram.

In the example shown, version agnostic resources "A" are either modified in mostly compatible ways between releases of versions of the application, or remain unchanged between such releases. At least in the context of the present description, "version agnostic resources" are resources whose presence in one version of an application and absence in another version of the application, or vice versa, is unlikely to have any harmful effects on application functionality. In other words, version agnostic resources are not specific to a particular version of an application. For example, references to classic web elements may change slightly in some releases. Version specific executable code and layout resources "B" (e.g., scripts, binaries, HTML, etc.) may be modified with each new release of the application in ways that are incompatible with the previous version(s). As an example, various contents comprising version specific executable code and layout resources "B" may change in a new release to reference updated filenames of dependent resources.

Version specific static resources "C" (e.g., HTML, images, CSS files, sprite sheets, audio files, video files, etc.) also may include contents that change in incompatible ways between releases. For example, new version specific static resources "C" may appear and/or old such resources disappear with each new release. URL fingerprinted resources "D" may include contents that never change between releases. In some scenarios, although filenames may change with each new release, such URL fingerprinted resources "D" may be cached "forever" (e.g., permanently or for an indefinite period of time). Service endpoints "E" may change or be modified for certain releases of versions of the application. Depending on the particulars of a given release, new service endpoints may appear while old service endpoints may be removed.

Figure 7B:
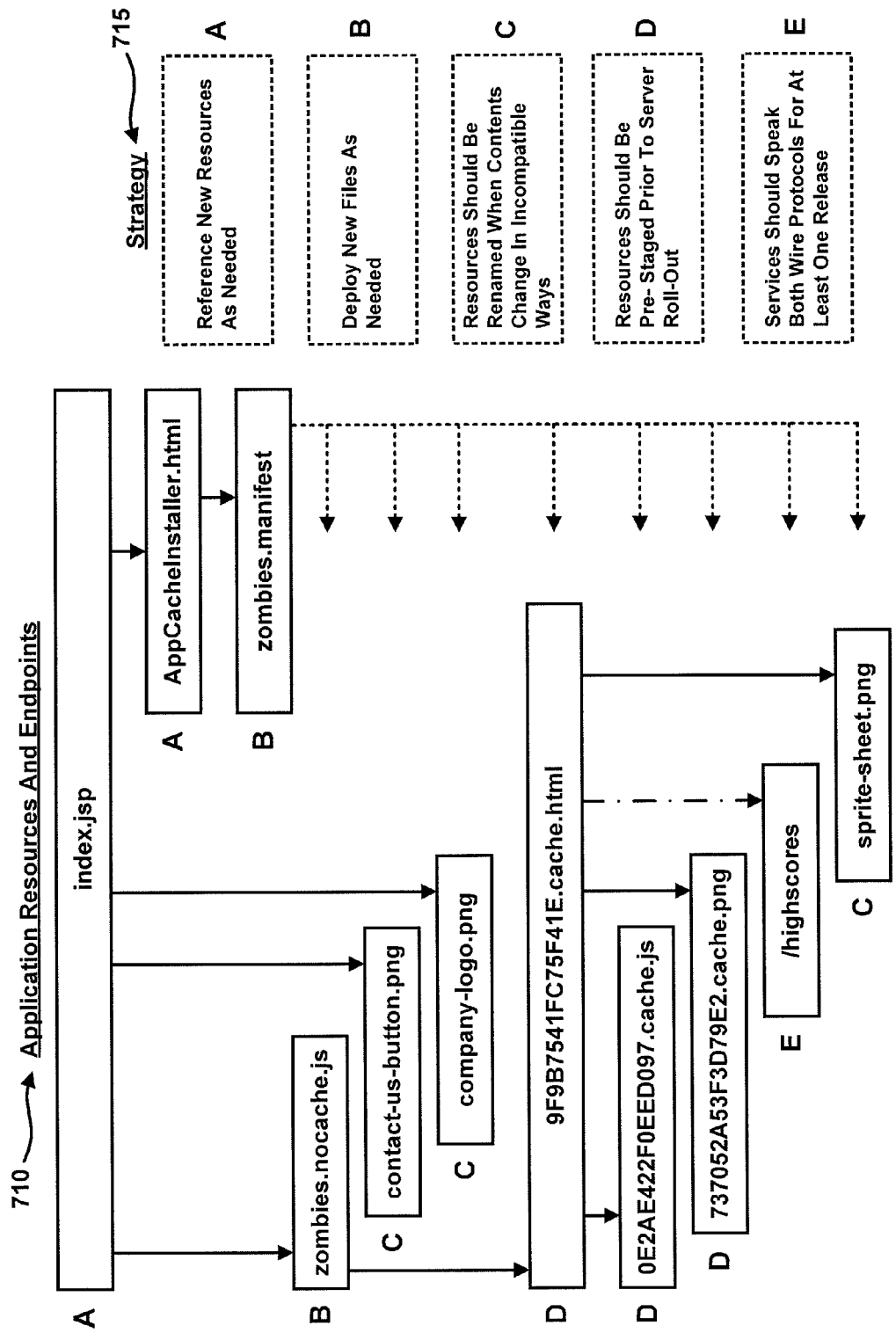
FIG. 7B is a block diagram illustrating an example flow of application resources and service endpoints together with corresponding strategies to implement during an application version upgrade process according to one or more embodiments described herein.

FIG. 7B is a block diagram illustrating a flow of application resources and service endpoints 710 along with corresponding strategies that may be implemented during an application upgrade process. Each of the boxes included under the "Strategy" section 715 is identified by a letter ("A" "B" "C" "D" and "E") and corresponds to similarly-identified elements in the diagram.

According to at least some embodiments described herein, one or more of the example implementation strategies 715 illustrated in FIG. 7A may be used to upgrade a version of an application without causing or creating any service interruption to clients. Strategy "A" involves referencing new resources as needed, and may be used with various version agnostic resources (e.g., version agnostic resources "A" as shown in FIG. 7A). A second strategy, strategy "B" involves deploying new files as needed. Strategy "B" may be used with various version specific executable code and layout resources (e.g., version specific executable code and layout resources "B" as shown in FIG. 7A), such as scripts, binaries, HTML, etc.

Additionally, example strategy "C" instructs that resources should be renamed when their contents change in incompatible ways across different versions of the application. In at least some embodiments, strategy "C" may be used with version specific static resources (e.g., version specific static resources "C" as shown in FIG. 7A), such as HTML, images, CSS files, sprite sheets, audio files, video files, and the like. Yet another strategy, strategy "D" involves pre-staging resources prior to rolling-out a new version of the application to the servers. In one example, strategy "D" may be implemented with URL fingerprinted resources (e.g., URL fingerprinted resources "D" as shown in FIG. 7A). Furthermore, strategy "E" directs that services should speak both wire protocol versions (e.g., the communication protocol used with the older version of the application and the communication protocol used with the new version of the application) for at least one release of the application upgrade. In at least some embodiments, this strategy may be understood as directing services to be able to communicate using a dual-protocol compatible with both the older and new versions of the application, where the dual-protocol includes both wire-protocol versions. Strategy "E" may be used with, for example, service endpoints (e.g., service endpoints "E" as shown in FIG. 7A).

It should be noted that one or more aspects of the example diagrams and scenarios illustrated in FIGS. 7A and 7B may be referred to in the following description of various features of the disclosure for purposes of supplementing the description and providing a helpful context for fully understanding such features. It should be understood that any such reference (as well as the absence of any such reference to a particular aspect or component of the diagrams shown in FIGS. 7A and 7B) is not in any way intended to limit the scope of the present disclosure.

Upgrading an Application Without Service Interruption

Various embodiments of the present disclosure relate to methods and systems for upgrading a web application without causing or creating any service interruption to clients (e.g., users). The following describes an example combination of techniques and strategies that may be employed in one or more preferred embodiments, using a considerable amount of care, to fully migrate all connected clients from first version (e.g., "Version A") to a second version (e.g., "Version B") of a given application:

1. URL fingerprinted resources should "never" conflict with each other: Version B resources may be made available to all servers in advance of the full/complete deployment of Version B of the application. This is reflected in strategy "D" as shown in FIG. 7B. Version A resources may remain available to all servers for some period of time (e.g., indefinitely or "forever") after all clients have been upgraded, but may be purged to conserve space as needed.

2. Service endpoints may change: These changes can be dealt with using a well-defined multi-step deployment process. The process begins with all clients and servers speaking Version A of the wire protocol. In the first step of the process, a new version of the service is rolled-out that speaks both Version A and Version B of the wire protocol, but defaults to Version A. The second step involves rolling-out new client software to all users, where the new software speaks wire protocol Version B. Once all the connected clients have been updated with the new Version B (e.g., are running the new version of the application or have the new version of the application installed thereon), or at some other time in the future, the third step involves removing the support for wire protocol Version A from all the services. In some arrangements, the requirement to wait for all clients to be updated with the new Version B before completing the process can be mitigated by defensively building in client-side logic configured to detect unknown (e.g., future) wire protocol versions and trigger a client software refresh. Implementing such a measure can be particularly useful when not all clients are required to check-in or access the service on a regular basis, which is generally the case for most web applications.

3. Version-specific static resources (e.g., HTML, images, CSS files, sprite sheets, audio & video files, etc.): To the extent changes in such resources are considered harmless (e.g., a small change to the highlights on a button image), changes can be rolled-out without much concern. When a resource is removed, the resource should remain available for at least one release to allow clients loading or running Version A to continue to fetch the resource from an upgraded Version B server. When a resource is added in a release, the resource should be pre-staged and made available to all servers prior to the rollout, otherwise Version B clients may try to request this resource from an ignorant Version A server. When content changes are breaking changes (e.g., modifications to the composition of a sprite sheet that has not been URL fingerprinted), the URL of the resource should be modified to ensure Version "X" clients do not request the (incorrect) resource from a Version "Y" server. Specifically, the old resource should remain available for at least one release and the new resource should be staged in advance of the rollout.

4. Version-specific executable code and layout (e.g., scripts, binaries, HTML, etc.): These resources should be treated in a similar way as described above for version-specific static resources. In particular, URLs should be modified with each release, old resources should remain after the rollout, and new resources should be staged in-advance of the rollout.

5. Version agnostic resources modified in mostly compatible ways: These resources can be rolled-out with little or only casual consideration of the changes.

It should be understood that in one or more embodiments of the disclosure, numerous other variations and/or combinations of the above techniques may similarly be employed to fully migrate all connected clients from a first version to a second version of an application (e.g., Version A to Version B).

Figure 8:
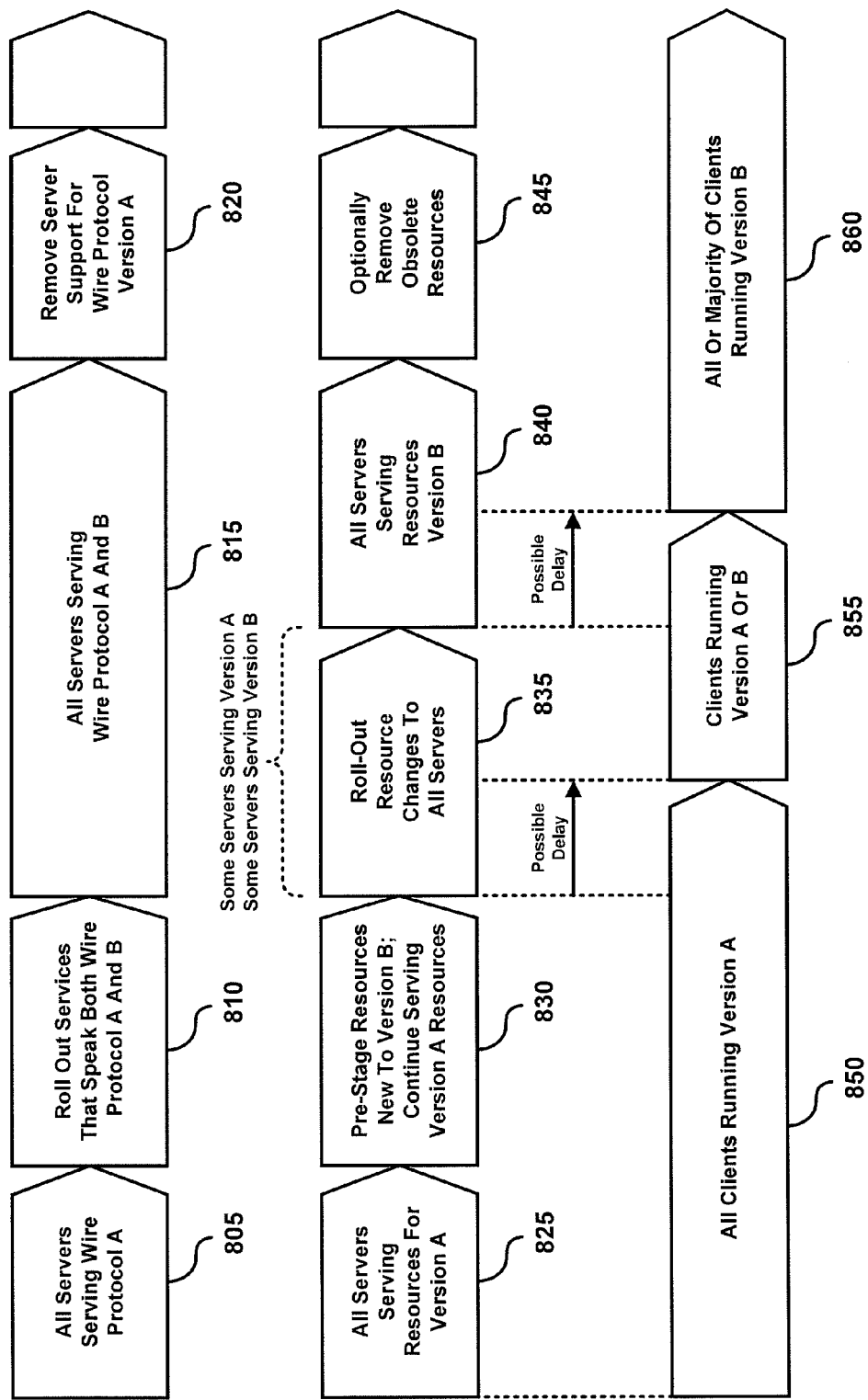
FIG. 8 is a block diagram illustrating an example method for deploying a new version of a web application according to one or more embodiments described herein.

FIG. 8 is a block diagram illustrating an example process for deploying a new version (e.g., Version B) of an application according to one or more embodiments of the present disclosure. It should be noted that the block diagram illustrated in FIG. 8 does not include resource name changes (e.g., from the resource names used in the older Version A) which, in at least some scenarios, should be made as part of the creation of Version B of the application.

Roll Out Strategies

Figure 9:
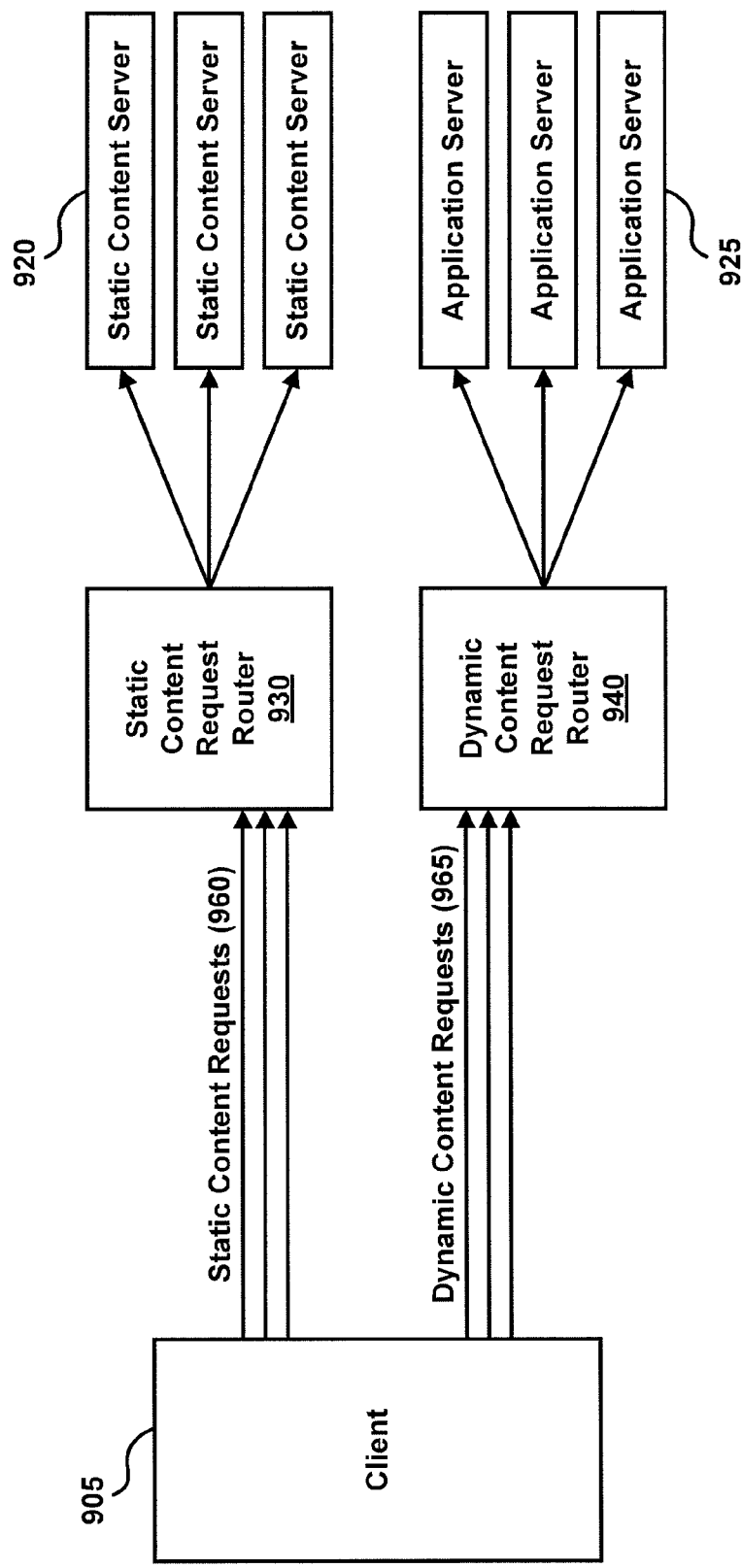
FIG. 9 is a block diagram illustrating an example arrangement for separately serving static content and dynamic content according to one or more embodiments described herein.

FIG. 9 is a block diagram illustrating an example arrangement for separately serving static content and dynamic content according to one or more embodiments of the present disclosure. Various methods of resource pre-staging (e.g., pre-staging resources step 830 of the example deployment process shown in FIG. 8) may be implemented when deploying a new version of a web application, depending on the particular features and capabilities of the serving platform and the project setup and architecture. One example method includes separating the serving of static content from the serving of dynamic content, as illustrated in FIG. 9 and described in greater detail below. Using a method such as this may enable the roll-out of updated static content, without requiring the immediate removal of old static content. It should be noted that such changes in the serving of static and dynamic content are independent of the actual service update, which may replace, on a server-by-server basis, an old set of service endpoints with new service endpoints.

As shown in the example arrangement of FIG. 9, static content requests 960 issued by a client 905 may be received at a static content request router 930, while dynamic content requests 965 issued by the client 905 may be received at a dynamic content request router 940. In at least some embodiments, the static content requests 960 received at the static content request router 930 may be routed to a static content server 920, while the dynamic content requests 965 received at the dynamic content request router 940 may be routed to an application server 925.

It should be noted that although the example arrangement illustrated in FIG. 9 includes both a static content request router 930 and a dynamic content request router 940, the separate serving of static content and dynamic content described above need not represent a physical separation of servers. Instead, all that is required is for the deployed static and dynamic content services to be logically separated. Such logical separation can be achieved, for example, by utilizing different domain names for the different versions of the application. Additionally, although the example arrangement illustrated in FIG. 9 includes a separation of static content request routing and dynamic content request routing, it should be noted that no such separation is required. Rather, such separation may make the implementation of various embodiments of the disclosure easier and/or more practical.

Furthermore, it should be understood that numerous other methods of resource pre-staging (e.g., pre-staging resources step 830 of the example deployment process shown in FIG. 8) may also be implemented when deploying a new version of a web application in addition to or instead of the example method described above. As mentioned, the particular resource pre-staging method used may depend on the specific features and capabilities of the serving platform, as well as the project setup and architecture involved.

Deploying the Application

Various methods and systems for upgrading to a new version of an application (e.g., a web application) as described in some of the embodiments of the present disclosure, are designed with at least two deployment constraints in mind. For example, one or more features of the methods and systems described herein are designed to (1) prevent clients from running with a mixture of resources from two different versions of an application (e.g., Version A and Version B of a given application); and (2) prevent clients from accessing service endpoints from a different version of the application than the client is running (e.g., accessing service endpoints for Version B when running Version A). A scenario in which either one of these constraints is present is likely to lead to failure or incorrect operation of the application.

In the following descriptions of various aspects of the disclosure related to deploying a new version of an application, reference is sometimes made to one or more components or elements of the hypothetical hybrid web application shown in FIGS. 7A and 7B. Reference may also be made to various other components or elements related to those of the hypothetical hybrid web application, but not shown in either of FIG. 7A or 7B. It should be understood that any such references made in the following descriptions are for purposes of illustration and are not in any way intended to limit the scope of the present disclosure.

Ramifications

Given the two exemplary deployment constraints describe above, once a client accesses the first page of an application (e.g., begins an application session), at least some embodiments require that the client be exclusively served with resources and access service endpoints from that same version of the application for the lifetime of the application session. Because contents of a given resource at a certain URI (e.g., /foo/bar/sprite_sheet.png) can differ between versions of an application, different hostnames/origins should be used for the different versions of the application. The following example illustrates this point:

(1) http://v1.foo.com/foo/bar/sprite_sheet.png
(2) http://v2.foo.com/foo/bar/sprite_sheet.png It should be noted that the use of different hostnames (e.g., v1.foo.com and v2.foo.com) across different versions of an application is merely one example of an URL versioning scheme that may be utilized in accordance with embodiments of the disclosure. Other URL versioning schemes are equally viable and may also be used in addition to or instead of the illustrative scheme described above. For example, the following is one of many alternative URL versioning schemes that may similarly be used:

(1) http://foo.com/foo/v1/bar/sprite_sheet.png
(2) http://foo.com/foo/v2/bar/sprite_sheet.png Because client sessions may last for a long period of time, hostnames and resources associated with previous version(s)

of an application should be maintained for a (potentially long) time following the roll-out of a new version of the application. In at least one implementation, such hostnames and resources for older versions of an application are maintained at least until all existing client sessions terminate.

In at least some embodiments, the deployment process requires that the current version of an application be available from a single, known, fixed URL. Such a requirement implies that the hostname (e.g., the domain name) of the application remain constant. Furthermore, since user agents display to a user the current URL of the application, users arriving at the landing page for an application cannot simply redirected to a version specific hostname or URL, as doing so would cause the user agent to no longer display the desired main landing page. In addition, due to the HTML5 application cache specification, various deployment implementations should also require a single, fixed, URL for both the application cache manifest and the main application URL/landing page.

Implementation

Applications may have more than one version being deployed at any given time (e.g., stage 855 of the example deployment process shown in FIG. 8 where clients are running Version A or Version B). While each version may have its own set of static resources and service endpoints, all versions require access to common persistent storage (e.g., so that application state remains available across releases). In addition, each application may always have one version that is set as the "default" or current version. According to one or more embodiments, user (e.g., client) requests that do not specify a specific version of an application as part of the URL, such as new visitors to the application, may be granted access to the default application version.

As is the case in at least some embodiments, a straightforward way to ensure that all resources and service endpoints are accessed via a version specific hostname is to use an HTML "href" tag in the <head> section of the main page and specify all URIs within the application as relative URIs (e.g., not containing a hostname). For example, assuming that the current version of an application is referred to as "r1942", the following can be used:

```
<!-- Main page/application landing page http://fredsa-zombies.appspot.com/ -->
<!DOCTYPE html>
<html>
<head>
    <!-- All relative URIs may use this as the base URL -->
    <base href="http://r1942.fredsa-zombies.appspot.com/" />
    <title>Zombies</title>
    <!-- Implies http://r1942.fredsa-zombies.appspot.com/zombies.nocache.js -->
    <script src="/zombies.nocachejs" />
</head>
<body>
    ...
    <!-- Implies http://r1942.fredsa-zombies.appspot.com/company-logo.png !
    <!-- Note: crossOrigin attribute enables CORS headers -->
    <img src="/company-logo.png" crossOrigin="anonymous"/>
    <!-- Necessarily at a fixed location due to HTML5 application cache specifications-->
    <iframe src="http://fredsa-zombies.appspot.com/AppCacheInstaller.html" />
    <!-- Implies http://r1942.fredsa-zombies.appspot.com/contact-us-button.png -->
    <img src="/contact-us-button.png" />
</body>
</html>
```

In the above example, the landing page utilizes an IFRAME element (which, among other things, defines an inline frame for the inclusion of external objects, including, for example, other HTML documents) to install an HTML5 Application Cache installation script, as shown in the following:

```
<!-- IFRAME served by http://fredsa-zombies.appspot.com/AppCacheInstaller.html -->
<!DOCTYPE html>
<!-- Implies http://fredsa-zombies.appspot.com/zombies.manifest -->
<html manifest="/zombies.manifest">
<head></head>
<body></body>
</html>
```

The use of such an IFRAME in various embodiments is optional, since the manifest may be specified on the main landing page. One advantage of the IFRAME is that it may be injected into the main document dynamically, based on a determination of whether the application should be "installed" (e.g., on a user's computing device) or made available for offline use. This determination may be made independently by the particular application code involved. For example, the determination may be made based on some user interaction, such as the user selecting an option to "install" the application for offline use.

Because clients maintain a unique HTML5 application cache for each web page (e.g., URL), and any previous application caches for an application are to be replaced with the latest version of the application cache, at least some implementations of the disclosure require that the application cache installation script described above live at a single, unique URL. In the example code snippet shown above where an IFRAME is used, the single, unique URL is http://fredsa-zombies.appspot.com/AppCacheInstaller.html. Additionally, in one or more implementations, it is necessary that the manifest itself also live at a single, unique URL (e.g., http://fredsa-zombies.appspot.com/zombies.manifest as shown the same example code snippet described above).

The following is an example application cache manifest in accordance with one or more embodiments described herein. In at least the following example, the application cache manifest includes both relative resources and absolute, version specific, URLs:

```
CACHE MANIFEST:
# HTML5 application cache manifest:
# http://fredsa-zombies.appspot.com/zombies.manifest
# Note: should change id for every new app version for cache to invalidate
# Unique id #810938209349039909824828
CACHE:
# Resources relative to http://fredsa-zombies.appspot.com/
/gwt-voices.swf
/
/AppCacheInstaller.html
# Absolute URLs for version specific resources
http://r1942.fredsa-zombies.appspot.com/zombies.nocache.js
http://r1942.fredsa-zombies.appspot.com/company-logo.png
http://r1942.fredsa-zombies.appspot.com/contact-us-button.png
http://r1942.fredsa-zombies.appspot.com/sprite-sheet.png
http://r1942.fredsa-zombies.appspot.com/9F9B7541FC75F41E.cache.html
http://r1942.fredsa-zombies.appspot.com/0E2AE422F0EED097.cache.js
``` http://r1942.fredsa-zombies.appspot.com/
737052A53F3D79E2.cache.png
All other resources (e.g., service endpoints) require the user to be online.

CORS Considerations

From the perspective of a user's browser, an application is executing in the context of the landing page origin, which may be for example, http://fredsa-zombies.appspot.com. While the main application code may be fetched cross origin (e.g., from http://r1942.fredsa-zombies.appspot.com/zombies.nocache.js), this application code is still executed with the permissions and privileges of the main URL, http://fredsa-zombies.appspot.com/. As such, any resources that need to be fetched by the application code or script from the http://r1942.fredsa-zombies.appspot.com origin are considered cross-origin fetches.

Application Cache Manifest Synchronization

As described above, in one or more embodiments of the disclosure a client visiting a given version of the main landing page for an application may only access resources consistent with that version of the application. While such a feature is applicable to version specific resources (e.g., http://r1942.fredsa-zombies.appspot.com/ . . . ), concerns involving other resources should also be addressed. One example is application cache resources, which do not have a version specific URL:

(1) http://fredsa-zombies.appspot.com/AppCacheInstaller.html (2) http://fredsa-zombies.appspot.com/zombies.manifest It should be noted that AppCacheInstaller.html need not contain any version specific information. Instead, this document is a trivial HTML page, which in some implementations may be served in an IFRAME that simply references the zombies.manifest resource.

Given the above, one or more embodiments of the present disclosure relates to methods and systems for synchronizing contents of non-version specific resources of an application. In one example, such resources may include two non-version specific URLs: the main landing page for an application and the application cache manifest.

In accordance with at least some embodiments described herein, the contents of non-version specific resources need to be synchronized since any given client request may be routed to any given server, and at any particular time not all servers may consider the same version of an application to be the current or "default" version. Such a scenario may arise, for example, when an application version update is currently in progress, rolling-out through a potentially large number of distributed servers.

In at least one embodiment, contents of non-version specific resources may be synchronized using a short-lived version cookie. Since cookies can prevent the efficient caching of resources, the application cache manifest may be moved into a sub-URL (e.g., /manifest/zombies.manifest), such that the scope of the cookie may be limited to, e.g., /manifest.

The following describes various features of an example implementation strategy involving the above-mentioned use of a short-lived cookie to synchronize contents of non-version specific resources. When serving the main landing page for an application (e.g., http://fredsa-zombies.appspot.com) the server may set a short-lived (e.g., expiration time of ten minutes, twelve minutes, fifteen minutes, etc.) scoped cookie (e.g., path: /manifest (meaning that the cookie is set only for paths matching "/manifest/ . . . ")), which may be referred to for purposes of this example as the "version cookie."

Additionally, when serving the application cache manifest file (e.g., http://fredsa-zombies.appspot.com/manifest/zombies.manifest) the server may check for the presence of the version cookie. If the version cookie is determined to be present, then the server may return the contents of the manifest corresponding to that version of the application. On the other hand, if the version cookie is found not to be present, then the server may instead return the contents of the manifest corresponding to the current or default version of the application.

Continuing with the context described in the above example, there are two primary scenarios to consider. The first such scenario involves clients that do not have an offline version of the application installed, while the second scenario involves clients that do have an offline version of the application installed. Each of these two scenarios will be expanded upon in greater detail below.

The first scenario, which involves a client that does not have an offline version of the application installed, may begin by a user navigating to the application main landing page. Upon doing so, the client (e.g., a user device being operated by the user) requests the main landing page from the server. In response to receiving the request from the client, the server returns, along with its response, a short-lived path:/manifest cookie that specifies the version of the landing page. The client eventually requests the manifest, and provides the cookie along with the request. In response, the server returns to the client a manifest version matching the requested version as indicated by the received cookie. The client then requests all resources specified in the manifest provided by the server, and upon receiving the requested resources the client stores the resources for later retrieval.

The second scenario, where a client does have an offline version of the application installed, may similarly begin by a user navigating to the application main landing page. Unlike in the first scenario described above, in this second scenario when the user navigates to the main landing page the client does not request the main landing page from the server. Instead, a copy of the main landing page in the application cache is accessed. The client determines the manifest URL for this "offline application," and (initially) requests only the manifest from the server. An example purpose for the client making such a request may be to determine whether the offline copy of the application is up to date.

Continuing with this second scenario, if the associated cookie has not yet expired, then the client may send the same cookie to the server, and in response the server may return to the client a matching manifest. In at least this example scenario, no further checks are performed during the session. However, if the associated cookie has expired, then the server can return to the client the version of the manifest determined by server to be the current version. If the version of the manifest returned by the server matches the cookie, then no further checks are performed during this session. On the other hand, if the version of the manifest returned by the server (e.g., the version determined by the server to be the "current" version) does not match the cookie, then the client may initiate a (background) retrieval of all updated resources, to be used the next time the application is accessed.

The expiration time of the cookie may be selected or set according to any of a variety of criteria and/or factors, depending on the particular implementation involved. For example, the expiration time of the cookie may be selected based on a determination of the maximum amount of time required to migrate all servers from one version to another. If this time is determined to be, for example, ten minutes at a maximum, and a comfortable buffer is added, then an expiration time of the cookie may be set at, for example, fifteen minutes.

Figure 10:
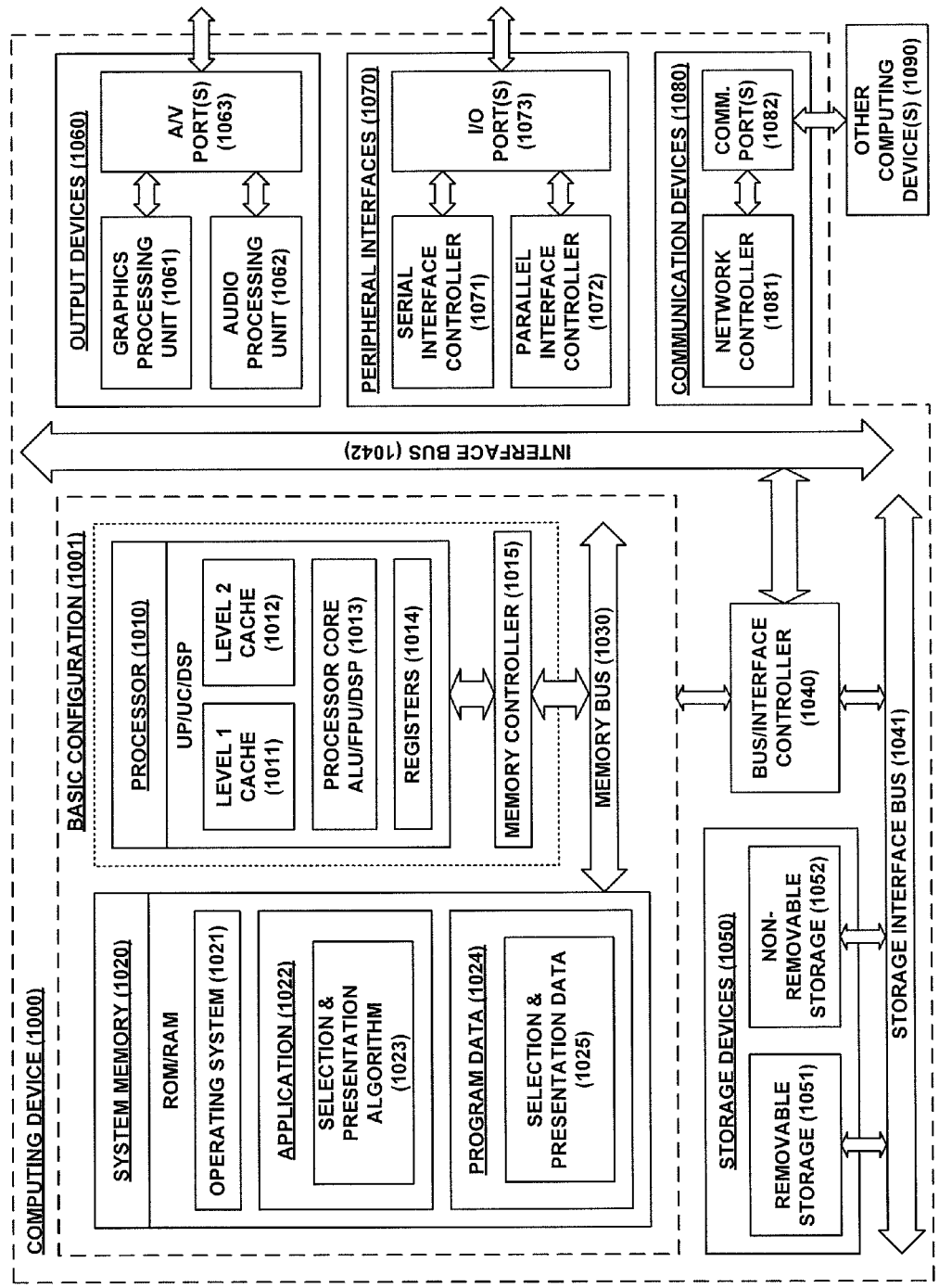
FIG. 10 is a block diagram illustrating an example computing device arranged for upgrading a version of a web application according to one or more embodiments described herein.

FIG. 10 is a block diagram illustrating an example computing device 1000 that is arranged for upgrading an existing version of an application (e.g., a web application) to a new version of the application in accordance with one or more embodiments of the present disclosure. In a very basic configuration 1001, computing device 1000 typically includes one or more processors 1010 and system memory 1020. A memory bus 1030 may be used for communicating between the processor 1010 and the system memory 1020.

Depending on the desired configuration, processor 1010 can be of any type including but not limited to a microprocessor (µP), a microcontroller (µC), a digital signal processor (DSP), or any combination thereof. Processor 1010 may include one or more levels of caching, such as a level one cache 1011 and a level two cache 1012, a processor core 1013, and registers 1014. The processor core 1013 may include an arithmetic logic unit (ALU), a floating point unit (FPU), a digital signal processing core (DSP Core), or any combination thereof. A memory controller 1015 can also be used with the processor 1010, or in some embodiments the memory controller 1015 can be an internal part of the processor 1010.

Depending on the desired configuration, the system memory 1020 can be of any type including but not limited to volatile memory (e.g., RAM), non-volatile memory (e.g., ROM, flash memory, etc.) or any combination thereof. System memory 1020 typically includes an operating system 1021, one or more applications 1022, and program data 1024. In at least some embodiments, application 1022 includes a selection and presentation algorithm 1023 that is configured to request a resource or service for use by an application running on a user device. Program Data 1024 may include selection and presentation data 1025. In some embodiments, application 1022 can be arranged to operate with program data 1024 on an operating system 1021 such that a request made by a user of a user device is routed to an appropriate server to fulfill the request.

Program Data 1024 may include selection and presentation data 1025. In some embodiments, application 1022 can be arranged to operate with program data 1024 on an operating system 1021 such that a request made by a user of a user device is routed to an appropriate server to fulfill the request.

Computing device 1000 can have additional features and/or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of computing device 1000.

Computing device 1000 can also include an interface bus 1042 for facilitating communication from various interface devices (e.g., output interfaces, peripheral interfaces, communication interfaces, etc.) to the basic configuration 1001 via the bus/interface controller 1040. Example output devices 1060 include a graphics processing unit 1061 and an audio processing unit 1062, either or both of which can be configured to communicate to various external devices such as a display or speakers via one or more A/V ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication device 1080 includes a network controller 1081, which can be arranged to facilitate communications with one or more other computing devices 1090 over a network communication (not shown) via one or more communication ports 1082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency trade-offs. There are various vehicles by which processes and/or systems and/or other technologies described herein can be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for providing clients with application updates while serving the clients continuous real-time data, the method comprising:
    serving, by a plurality of servers using a first version of a protocol to communicate with a plurality of client devices, application resources and services for a first version of an application running on each of the plurality of client devices;
    updating the plurality of servers to communicate with the plurality of client devices using a dual-protocol compatible with both the first version of the application and a second version of the application, the dual-protocol including the first version of the protocol and a second version of the protocol;
    serving, by the plurality of servers to the plurality of client devices, application resources and services for the second version of the application using the second version of the protocol, the application resources and services for the second version of the application being different from the application resources and services for the first version of the application;
    responsive to determining that the second version of the application is installed on each of the plurality of client devices, removing support for the first version of the protocol from the plurality of servers; and
    responsive to determining that an application resource for the second version of the application does not exist for the first version of the application, providing the application resource for the second version of the application to the plurality of servers before the plurality of servers begins using the second version of the protocol.

2. The method of claim 1, wherein the plurality of servers are updated to communicate with the plurality of client devices using the dual-protocol while the plurality of servers serve continuous real-time data to the plurality of client devices.

3. The method of claim 2, wherein the plurality of servers serve the application resources and services for the second version of the application to the plurality of client devices using the second version of the protocol while also serving continuous real-time data to the plurality of client devices.

4. The method of claim 3, wherein the support for the first version of the protocol is removed from the plurality of servers while the plurality of servers serve continuous real-time data to the plurality of client devices.

5. The method of claim 1, further comprising:
    responsive to determining that the second version of the application is installed on each of the plurality of client devices, removing the application resources and services for the first version of the application from the plurality of servers.

6. The method of claim 1, further comprising:
    responsive to determining that an application resource for the first version of the application does not exist for the second version of the application, maintaining the application resource for the first version of the application on one or more of the plurality of servers updated to communicate using the second version of the protocol.

7. The method of claim 1, wherein the application resources and services for the first and second versions of the application include at least one of version-agnostic resources, version-specific static resources, version-specific executable code, URL fingerprinted resources, and service endpoints.

8. The method of claim 1, wherein the application resources and services for the first and second versions of the application include version-agnostic resources, version-specific static resources, version-specific executable code, URL fingerprinted resources, and service endpoints.

9. The method of claim 1, wherein the application resources and services for the second version of the application include URL fingerprinted resources for the second version of the application, and further comprising:
providing the URL fingerprinted resources for the second version of the application to the plurality of servers before the plurality of servers begins serving the application resources and services for the second version of the application to the plurality of client devices using the second version of the protocol.

10. The method of claim 1, wherein the application resources and services for the first version of the application include URL fingerprinted resources for the first version of the application, and further comprising:
maintaining the URL fingerprinted resources for the first version of the application on the plurality of servers following the determination that the second version of the application is installed on each of the plurality of client devices.

11. The method of claim 1, wherein the application resources and services for the second version of the application include version-specific static resources not included in the application resources and services for the first version of the application, and further comprising:
providing the version-specific static resources to the plurality of servers before the plurality of servers begins serving the application resources and services for the second version of the application to the plurality of client devices using the second version of the protocol.

12. The method of claim 1, wherein the application resources and services for the first version of the application include version-specific static resources not included in the application resources and services for the second version of the application, and further comprising:
maintaining the version-specific static resources on one or more of the plurality of servers following the determination that the second version of the application is installed on each of the plurality of client devices.

13. The method of claim 1, wherein the application resources and services for the second version of the application include version-specific executable code not included in the application resources and services for the first version of the application, and further comprising:
providing the version-specific executable code to the plurality of servers before the plurality of servers begins serving the application resources and services for the second version of the application to the plurality of client devices using the second version of the protocol.

14. The method of claim 1, wherein the application resources and services for the first version of the application include version-specific executable code not included in the application resources and services for the second version of the application, and further comprising:
maintaining the version-specific executable code on one or more of the plurality of servers following the determination that the second version of the application is installed on each of the plurality of client devices.

15. A system for providing a client with application updates while serving the client continuous real-time data, the system comprising:
at least one processor; and
at least one memory storing computer-executable instructions that, when executed by the at least one processor, cause the at least one processor to:
serve, using a first version of a protocol to communicate with at least one client device, application resources and services for a first version of an application running on the at least one client device;
update, to communicate with the at least one client device using a dual-protocol compatible with both the first version of the application and a second version of the application, the dual-protocol including the first version of the protocol and a second version of the protocol;
serve, to the at least one client device, application resources and services for the second version of the application using the second version of the protocol, the application resources and services for the second version of the application being different from the application resources and services for the first version of the application;
responsive to determining that the second version of the application is installed on the at least one client device, discard support for the first version of the protocol; and
responsive to determining that an application resource for the second version of the application does not exist for the first version of the application, receive the application resource for the second version of the application before using the second version of the protocol.

16. The system of claim 15, wherein the at least one processor updates to communicate with the at least one client device using the dual-protocol while the at least one processor also serves continuous real-time data to the at least one client device.

17. The system of claim 16, wherein the at least one processor serves the application resources and services for the second version of the application to the at least one client device using the second version of the protocol while the at least one processor also serves continuous real-time data to the at least one client device.

18. The system of claim 17, wherein the at least one processor discards support for the first version of the protocol while the at least one processor also serves continuous real-time data to the at least one client device.

19. The system of claim 15, wherein the instructions further cause the at least one processor to:
responsive to determining that the second version of the application is installed on the at least one client device, discard the application resources and services for the first version of the application.

20. The system of claim 15, wherein the instructions further cause the at least one processor to:
responsive to determining that an application resource for the first version of the application does not exist for the second version of the application, maintain the application resource for the first version of the application after updating to communicate using the second version of the protocol.

21. The system of claim 15, wherein the application resources and services for the first and second versions of the application include at least one of version-agnostic resources, version-specific static resources, version-specific executable code, URL fingerprinted resources, and service endpoints.

22. The system of claim 15, wherein the application resources and services for the second version of the application include URL fingerprinted resources for the second version of the application, and wherein the instructions further cause the at least one processor to:
  receive the URL fingerprinted resources for the second version of the application before the at least one processor begins serving the application resources and services for the second version of the application to the at least one client device using the second version of the protocol.

23. The system of claim 15, wherein the application resources and services for the first version of the application include URL fingerprinted resources for the first version of the application, and wherein the instructions further cause the at least one processor to:
  maintain the URL fingerprinted resources for the first version of the application following the determination that the second version of the application is installed on the at least one client device.

24. The system of claim 15, wherein the application resources and services for the second version of the application include version-specific static resources not included in the application resources and services for the first version of the application, and wherein the instructions further cause the at least one processor to:
  receive the version-specific static resources before the at least one processor begins serving the application resources and services for the second version of the application to the at least one client device using the second version of the protocol.

25. The system of claim 15, wherein the application resources and services for the first version of the application include version-specific static resources not included in the application resources and services for the second version of the application, and wherein the instructions further cause the at least one processor to:
  maintain the version-specific static resources following the determination that the second version of the application is installed on the at least one client device.

26. The system of claim 15, wherein the application resources and services for the second version of the application include version-specific executable code not included in the application resources and services for the first version of the application, and wherein the instructions further cause the at least one processor to:
  receive the version-specific executable code before the at least one processor begins serving the application resources and services for the second version of the application to the at least one client device using the second version of the protocol.

27. The system of claim 15, wherein the application resources and services for the first version of the application include version-specific executable code not included in the application resources and services for the second version of the application, and wherein the instructions further cause the at least one processor to:
  maintain the version-specific executable code following the determination that the second version of the application is installed on the at least one client device.

28. A computer-implemented method for providing clients with application updates, the method comprising:
  serving to a plurality of client devices, using a first version of a communication protocol, application resources and services for a first version of an application running on each of the plurality of client devices;
  updating to a dual-communication protocol compatible with both the first version of the application and a second version of the application, the dual-communication protocol including the first version of the communication protocol and a second version of the communication protocol;
  serving to the plurality of client devices, using the second version of the communication protocol, application resources and services for the second version of the application, the application resources and services for the second version of the application being different from the application resources and services for the first version of the application;
  responsive to determining that the second version of the application is installed on each of the plurality of client devices, removing support for the first version of the communication protocol; and
  responsive to determining that an application resource for the second version of the application does not exist for the first version of the application, obtaining the application resource for the second version of the application before using the second version of the communication protocol.

* * * * *